United States Patent [19]
Crone, Jr. et al.

[11] 3,760,019
[45] Sept. 18, 1973

[54] HYDROALKYLATION CATALYST AND PROCESS

[75] Inventors: John M. Crone, Jr., Fishkill; Alfred Arkell, Wappingers Falls, both of N.Y.

[73] Assignee: Texaco, Inc., New York, N.Y.

[22] Filed: May 17, 1971

[21] Appl. No.: 144,214

[52] U.S. Cl. .......... 260/668 F, 260/667, 260/668 R
[51] Int. Cl. ............................................. C07c 15/20
[58] Field of Search ............. 260/667, 668 R, 668 F

[56] References Cited
UNITED STATES PATENTS

| | | | |
|---|---|---|---|
| 3,153,678 | 10/1964 | Logemann | 260/667 |
| 3,491,019 | 1/1970 | Pollitzer et al. | 260/667 |
| 3,412,165 | 11/1968 | Slaugh et al. | 260/667 |
| 3,274,276 | 9/1966 | Louvar | 260/667 |
| 3,317,611 | 5/1967 | Louvar et al. | 260/667 |
| 3,397,249 | 8/1968 | Aben et al. | 260/667 |

*Primary Examiner*—Curtis R. Davis
*Attorney*—Thomas H. Whaley, Carl G. Ries and H. L. Madinger

[57] ABSTRACT

A method for the catalytic hydroalkylation of an aromatic hydrocarbon. An aromatic hydrocarbon, for example, benzene is contacted with hydrogen and a dual function catalyst at hydroalkylation conditions including a temperature within the range of about 110° to 450°F. and at a hydrogen pressure of at least one atmosphere. The dual function catalyst comprises a Group VIII metal or metal compound selected from the group consisting of nickel, and cobalt and an acidic oxide support consisting essentially of a silica-alumina cracking catalyst. A preferred Group VIII metal is nickel. The hydrogenation activity of the Group VIII metal may be modified by the inclusion of tungsten. Before use the composite catalyst is steamed at a temperature within the range of about 800° to 1400°F. and is reduced with hydrogen at a temperature within the range of about 400° to 1200°F. The process is useful in the hydroalkylation of benzene to prepare cyclohexylbenzene.

14 Claims, No Drawings

HYDROALKYLATION CATALYST AND PROCESS

BACKGROUND OF THE INVENTION

Cycloalkylbenzenes may be produced by the hydroalkylation of benzene and alkylbenzene hydrocarbons. For example, benzene may be reacted with hydrogen in the presence of a hydroalkylation catalyst to produce cyclohexylbenzene. By-products of this reaction may include cyclohexane, methylcyclopentane, dicyclohexylbenzenes and polycyclohexylbenzenes. Similarly, toluene may be hydroalkylated to produce the corresponding alkylcyclohexylalkylbenzenes. Mixtures of dissimilar aromatic hydrocarbons may be hydroalkylated in which case the more readily hydrogenated species tends to alkylate the less readily hydrogenated compound. For example, hydroalkylation of a benzene-toluene mixture may produce a product predominating in cyclohexyltoluene since benzene may be hydrogenated more readily than toluene. Products of the hydroalkylation process such as cyclohexylbenzene are valuable as solvents and as chemical intermediates. For example, cyclohexylbenzene is of commercial importance as a solvent and plasticizer in the plastics coatings and adhesives fields and as an intermediate in the manufacture of cyclohexanone and phenol by air oxidation and acid decomposition.

It is an object of the present invention to provide an improved catalyst and process for the hydroalkylation of benzene and alkylbenzene hydrocarbons. It is a further objective to provide a highly active hydroalkylation catalyst achieving high selectivity in conversion of benzene and alkylbenzenes to the corresponding cyclohexylbenzenes and cyclohexylalkylbenzenes. It is a further objective to provide a stable hydroalkylation catalyst capable of maintaining a high activity and selectivity in sustained use on a continuous basis.

SUMMARY OF THE INVENTION

It is postulated that the hydroalkylation of benzene to cyclohexylbenzene, as an example of the hydroalkylation process, proceeds by hydrogenation of a part of the benzene to a cyclohexane intermediate which intermediate then alkylates remaining benzene to produce the cyclohexylbenzene product. Thus the dual catalytic functions of hydrogenation and alkylation are required. However, a careful balance of these two functions is necessary such that the hydrogenation and alkylation reactions may proceed at complimentary rates. Hydrogenation activity is imparted by the use of a metallic catalyst, for example, a Group VIII metal while alkylation requires an acidic type catalyst. Excessive hydrogenation activity results in the production of unwanted cyclohexane whereas excessive acid activity may result in isomerization of the intermediates so that the final reaction product comprises a variety of products besides cyclohexylbenzene. In accordance with the process of this invention a hydroalkylation catalyst of high activity, selectivity, and stability is prepared by steaming and reducing the catalyst comprising a Group VIII metal selected from the group consisting of cobalt and nickel and an acidic oxide support consisting essentially of a silica-alumina cracking catalyst. The foregoing composition is steamed at about atmospheric pressure and at a temperature within the range of about 800° to 1400°F. preferably at about 1100°F. and is reduced at a temperature within the range of about 400° to 1000°F. to prepare the hydroalkylation catalyst of our improved process. Hydroalkylation is effected by contacting an aromatic hydrocarbon charge selected from the group consisting of benzene, alkylbenzenes, and their mixtures with the foregoing catalyst at hydroalkylation conditions including a reaction temperature within the range of about 110° to 450°F. and preferably within the range of about 300° to 400°F. and at a hydrogen partial pressure in excess of one atmosphere and preferably within the range of about 100 to 500 pounds per square inch gauge.

DESCRIPTION OF THE PREFERRED EMBODIMENTS

The improved process of the present invention is carried out in the presence of a novel hydroalkylation catalyst. The catalyst comprises a hydrogenating component and a alkylating component. The hydrogenating component comprises a metal or a compound of a metal selected from the group consisting of cobalt and nickel. The alkylating component of the catalyst comprises an acidic oxide support consisting essentially of a silica-alumina cracking catalyst. The hydrogenating component may be modified by the inclusion of tungsten or a tungsten compound.

The silica-alumina cracking catalyst constituent of our composite catalyst may be any of the well known and commercially available silica-alumina cracking catalyst including both synthetic catalysts and those prepared by the processing of clays. Such catalysts are described for example in U. S. Pat. Nos. 2,363,231, 2,469,314, and 2,935,463.

Ordinarily the hydrogenating component is added to the acidic oxide support. Preferably this is done by contacting the support with a solution of a compound of the hydrogenating metal component. The hydrogenating component may be deposited by draining any excess solution from the composite and drying. Ordinarily, the catalyst is then calcined in an oxidizing atmosphere. By this procedure the hydrogenating component will be in the form of the oxide deposited on the acidic oxide support.

Heretofore, hydroalkylation catalysts have been activated by calcining at temperatures of about 800° to 1500°F. and then reduced at temperatures of about 400° to 1200°F. We have found that unexpectedly high activity and selectivity may be imparted to hydroalkylation catalyst comprising a hydrogenating metal composited with a silica-alumina cracking catalyst acidic oxide support by treating the composite catalyst with steam in place of calcining prior to reducing. The steam treatment is effected at a temperature of about 800° to 1400°F. preferably at about 1100°F. Steaming at about atmospheric pressure is preferred for a time of about 0.5 to 8 hours. Higher pressures may be employed with corresponding reduction in steaming time or temperature.

In the following examples, a silica-alumina cracking catalyst base containing 13 weight percent alumina and 87 weight percent silica serves as an acidic oxide support. Five weight percent nickel is then deposited on the surface of the acidic oxide support. The silica-alumina base is prepared by acidifying an aqueous sodium silicate solution with aqueous sulfuric acid, washing the resulting hydrated silica free from alkali metal salts, suspending the hydrated silica in an aluminum sulfate solution, precipitating alumina with ammonia, filtering and washing. The silica-alumina filter cake is then impregnated with a nickel nitrate solution, the composite dried and heated to decompose the nitrate and deposit the nickel as oxide. This catalyst is then activated by calcining in air followed by reduction with hydrogen in Examples 1 and 2 and by contacting with steam followed by reduction with hydrogen in Example 3.

In Example 1, the catalyst is calcined in air at 1000°F. for 5 hours and then reduced with hydrogen at 900°F. for 8 hours. In Example 2, the catalyst is calcined in air at 1200°F. for 2 hours and then reduced with hydrogen at 900°F. for 15 hours. In Example 3, the catalyst is contacted at 1100°F. with steam at atmospheric pressure for 2 hours and then reduced with hydrogen at 900°F for 4 hours. The three catalysts are then evaluated for benzene hydroalkylation with the results shown in Table I.

TABLE I

| Example | 1 | 2 | 3 |
|---|---|---|---|
| Product Yield | | | |
| Methylcyclopentane | 0.1 | 0.1 | 0.2 |
| Cyclohexane | 11.5 | 11.3 | 8.2 |
| Cyclohexylbenzene | 6.6 | 8.2 | 15.6 |
| Dicyclohexylbenzene | 0.2 | 0.7 | 2.4 |
| Conversion | 19 | 20 | 26 |
| Selectivity | 36 | 40 | 59 |
| Productivity | 26 | 67 | 122 |

In all examples, 39 grams (0.5 mole) of benzene and 2.25 grams of catalyst are added to the reactor. The reactor is then purged with hydrogen, heated to a reaction temperature within the range of 370° to 380°F. and pressured with hydrogen to a pressure of 500 p.s.i.g. Reaction is continued by rocking the reactor while maintaining the pressure at 500 p.s.i.g. by the continuous addition of hydrogen until 4650 cubic centimeters of hydrogen are absorbed. Conversion is expressed as the ratio of the weight of benzene converted to the weight of benzene charged X 100. Productivity is expressed as the ratio of the weight of cyclohexylbenzene to the product of the time in hours and the catalyst volume.

We claim:

1. A method for the catalytic hydroalkylation of an aromatic hydrocarbon charge selected from the group consisting of benzene, alkylbenzenes and their mixtures which comprises contacting said aromatic hydrocarbon charge and hydrogen at hydroalkylation conditions with a steamed and reduced catalyst comprising a Group VIII metal selected from the group consisting of cobalt and nickel and an acidic oxide support consisting essentially of a silica-alumina cracking catalyst.

2. The method of claim 1 wherein said hydroalkylation conditions include a reaction temperature within the range of about 110° to 450°F. and a hydrogen partial pressure of at least one atmosphere.

3. The method of claim 1 wherein said hydroalkylation conditions include a reaction temperature within the range of about 300° to 400°F. and a hydrogen partial pressure within the range of about 100 to 500 pounds per square inch gauge.

4. The method of claim 1 wherein said Group VIII metal is nickel.

5. The method of claim 1 wherein said catalyst consists essentially of tungsten, said Group VIII metal and said acidic oxide support.

6. The method of claim 1 wherein said catalyst is steamed at a temperature within the range of about 800° to 1400°F.

7. The method of claim 1 wherein said catalyst is steamed at a temperature of about 1100°F.

8. The method of claim 1 wherein said catalyst is reduced at a temperature within the range of about 400° to 1200°F.

9. The method of claim 1 wherein said catalyst is reduced at a temperature within the range of about 800° to 1000°F.

10. The method of claim 1 wherein said aromatic hydrocarbon charge is benzene.

11. A method for the catalytic hydroalkylation of an aromatic hydrocarbon charge selected from the group consisting of benzene, alkylbenzenes, and their mixtures which comprises contacting said aromatic hydrocarbon charge and hydrogen at hydroalkylation conditions with a steamed and reduced catalyst consisting essentially of (a) cobalt or nickel and (b) as an acidic oxide support, a silica-alumina cracking catalyst, said catalyst having been steamed at 800°F.–1400°F.

12. A method for the catalytic hydroalkylation of an aromatic hydrocarbon charge as claimed in claim 11 wherein said catalyst is steamed at atmospheric pressure at 800°F.–1400°F.

13. A method for the catalytic hydroalkylation of an aromatic hydrocarbon charge as claimed in claim 11 wherein said catalyst is steamed at atmospheric pressure at 800°F.–1400°F. for 0.5–8 hours and is thereafter reduced at 800°F.–1000°F.

14. A method for the catalytic hydroalkylation of benzene which comprises contacting benzene charge and hydrogen at hydroalkylation conditions, including reaction temperature of 110°F.–450°F. and hydrogen partial pressure of greater than one atmosphere and less than about 500 psig, with a steamed and reduced catalyst comprising a Group VIII metal selected from the group consisting of cobalt and nickel and an acidic oxide support consisting essentially of a silica-alumina cracking catalyst, said catalyst having been steamed at atmospheric pressure at 800°F.–1400°F. for 0.5–8 hours and thereafter reduced at 800°F–1000°F.

* * * * *